(12) United States Patent
Anderson

(10) Patent No.: US 6,226,340 B1
(45) Date of Patent: *May 1, 2001

(54) HERMAPHRODITIC ABSORBER LOADING FOR HIGHER WORTH CONTROL RODS

(75) Inventor: Michael J. Anderson, Las Vegas, NV (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,672

(22) Filed: Jul. 9, 1997

Related U.S. Application Data

(63) Continuation-in-part of application No. 08/652,341, filed on May 22, 1996, now abandoned.

(51) Int. Cl.$^7$ ........................................... G21C 7/06
(52) U.S. Cl. ............................................ 376/333; 376/339
(58) Field of Search .................................. 376/333, 307, 376/339

(56) References Cited

U.S. PATENT DOCUMENTS

| | | | |
|---|---|---|---|
| 2,859,163 | 11/1958 | Ploetz et al. ........................ | 204/193.2 |
| 2,935,401 | 5/1960 | Anderson et al. ..................... | 75/173 |
| 3,074,871 | 1/1963 | Lustman et al. ..................... | 204/193.2 |

(List continued on next page.)

FOREIGN PATENT DOCUMENTS

| | | | |
|---|---|---|---|
| 3 437 112 | 5/1985 | (DE) . | |
| 0 055 371 | 7/1982 | (EP) . | |
| 0 130 483 | 1/1985 | (EP) . | |
| 2 041 723 | 2/1971 | (FR) . | |
| 2041723 | * 2/1971 | (FR) | ...................... 376/333 |
| 1 067 523 | 5/1967 | (GB) . | |
| 51-69797 | 6/1976 | (JP) . | |
| 0 079 993 | 6/1981 | (JP) . | |
| 57-80592 | 5/1982 | (JP) . | |
| 0 162 893 | 9/1983 | (JP) . | |
| 0 085 390 | 5/1985 | (JP) . | |
| 0 157 080 | 8/1985 | (JP) . | |
| 0157080 | * 8/1985 | (JP) | ...................... 376/333 |
| 3-205596 | 8/1988 | (JP) . | |
| 3205596 | * 8/1988 | (JP) | ...................... 376/333 |
| 3-261194 | 10/1988 | (JP) . | |
| 6-186373 | 7/1994 | (JP) . | |
| WO 94/28556 | 12/1994 | (WO) . | |

OTHER PUBLICATIONS

Kerntechnik, vol. 57, No. 2, pp 102–106, Vesterlund et al, 1992.*

"MCNP™—A General Monte Carlo N–Particle Transport Code," LA–12625–M, UC 700 & 705 Manual, J.F., Briesmeister, Editor, Nov., 1993.

Primary Examiner—Harvey E Behrend
Assistant Examiner—Ina Bentley
(74) Attorney, Agent, or Firm—Nixon & Vanderhye P.C.

(57) ABSTRACT

A hermaphroditic absorber exploits the inherent spatial change in the neutron spectrum within a lumped poison mass in a thermal reactor neutron flux field. The hermaphroditic absorber (poison mass) incorporates two types of absorbers, the first being a strong thermal absorber near the surface of the mass, and the second being a strong resonant absorber in the interior of the poison mass. The outer regions of the poison mass are comprised of a strong "1/v" thermal absorber, and the inner region of the poison mass is comprised of a resonance absorber. This resonance absorber more appropriately exploits the hardened characteristics of the neutron spectrum within the absorber mass by selectively absorbing the epi-thermal neutrons. The creation of the hermaphroditic poison mass permits an increase in the control material worth while maintaining the external dimension of the structure containing the control material, such as a BWR control rod.

8 Claims, 3 Drawing Sheets

U.S. PATENT DOCUMENTS

| | | | |
|---|---|---|---|
| 3,103,479 | * 9/1963 | Ransohoff | 376/333 |
| 3,219,593 | 11/1965 | Kling et al. | 252/478 |
| 3,250,729 | 5/1966 | Petzow et al. | 252/478 |
| 3,255,092 | 6/1966 | Dee, Jr. | 376/333 |
| 3,280,329 | 10/1966 | Harmer et al. | 250/106 |
| 3,485,717 | 12/1969 | Eich . | |
| 3,923,502 | 12/1975 | Portnoi et al. | 75/170 |
| 4,655,999 | * 4/1987 | Maruyama et al. | 376/333 |
| 4,668,310 | 5/1987 | Kudo et al. | 148/304 |
| 4,992,225 | 2/1991 | Diemen et al. | 376/339 |
| 5,075,075 | * 12/1991 | Kapil | 376/333 |
| 5,276,718 | * 1/1994 | Ueda et al. | 376/333 |

* cited by examiner

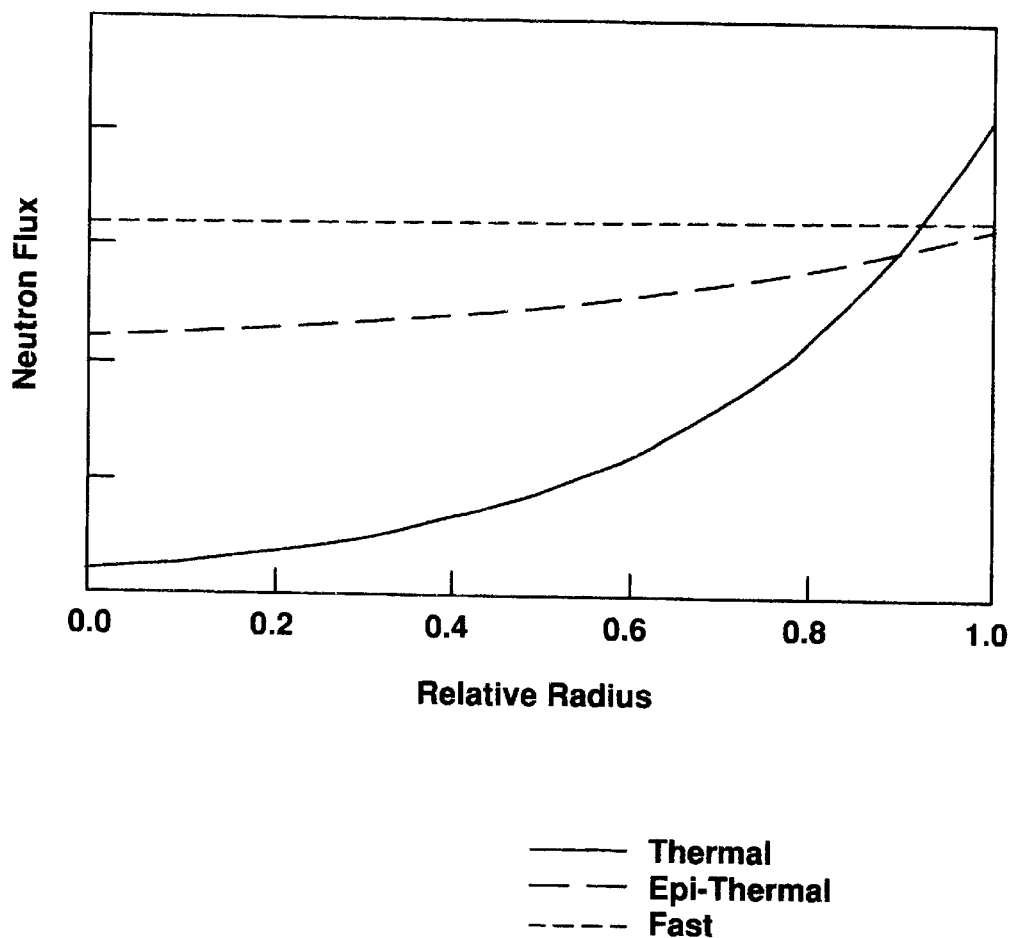

HERMAPHRODITIC ABSORBER LOADING FOR HIGHER WORTH CONTROL RODS

This application is a continuation-in-part of U.S. application Ser. No. 08/652,341, filed May 22, 1996, now abandoned.

TECHNICAL FIELD

This invention relates to a control rod for a nuclear reactor and, more specifically, to a thermal reactor lumped control material having increased control worth by virtue of hermaphroditic absorber loading.

BACKGROUND

Control materials (poison), such as control rods, are employed in, for example, nuclear reactors to perform duel functions of power distribution and reactivity control. Power distribution in the core is controlled during the operation of the reactor by manipulation of selected patterns of rods that enter from the bottom of the reactor core. Each control rod in its power distribution function may experience a similar or a very different neutron exposure than other control rods in the control system. Control rods are generally cruciform in cross section and typically comprise a plurality of absorber tubes extending axially in each wing of the rod. In one design, the tubes are filled with boron carbide powder and seal-welded at their ends with end plugs. The powder is separated into sections or segments. In another design, the tubes are filled with capsules of discrete lengths containing the boron carbide powder. A plurality of stainless steel capsules are stacked in each tube with the tubes lying side by side in each wing of the control rod, generally in parallel with the long axis of the rod. These capsules or segments, for example, may have lengths of one foot or more.

Control materials such as control rods having higher worth are important to obtain adequate control for thermal reactors that incorporate mixed oxide fuels and may have an economic benefit for uranium-fueled thermal reactors.

Thermal reactor poison loadings are usually characterized by periodically distributed masses of strong thermal absorbers, particularly boron carbide. Because of the short mean free path of thermal neutrons in such a mass, most of the absorptions occur near the surface of the mass, and the remainder of the poison mass is less effective as a thermal absorber.

This effect can be better understood by a lumped mass of boron carbide in a neutron flux field, where the neutrons are assumed to have a spectral distribution consistent with a thermal reactor spectrum. The thermal neutrons in this field are strongly absorbed by the poison at the surface of the boron carbide (the "onion skin" effect). The resulting neutron distribution in the interior of the poison mass has a much lower fraction of thermal neutron than the external field. Therefore, the absorber in the interior of the poison mass has a much lower neutron absorption rate.

This effect is compounded by the fact that boron carbide is a "1/v" absorber—i.e., its cross section is inversely proportional to the neutron energy; therefore, boron carbide in the center of a poison mass is much less effective at absorbing neutrons than the same material at the surface of the mass due to spectral hardening.

The strength of the control rods in a nuclear reactor helps define the amount of fissile material that may be loaded in the core while assuring that the fission reactions in the core may be curtailed at any time. Stronger control rods permit the loading of a larger fissile inventory without corresponding increases in integral burnable absorbers (e.g., Gadolinia). Similarly, they also ease the introduction of mixed-oxide fuel. Because of the larger thermal absorption cross section of plutonium, such fuel makes conventional boron carbide loaded control rods less effective, not only because of the spectral change due to absorption hardening, but also because of a decrease in the flux in the vicinity of the lumped poison (for a fixed number of neutrons, there is a greater fraction absorbed in the more strongly absorbing discrete fuel masses).

As with all high worth absorbers, higher worth implies faster destruction of absorber atoms. Unless a chain absorber (an element where nuclides transmute with neutron absorption, either directly or indirectly through radioactive decay, to other nuclides with large absorption cross sections) is used, the time span that such a lumped poison may be used is shorter than a lumped poison with a lower worth.

DISCLOSURE OF THE INVENTION

According to the present invention, the control worth of a thermal reactor lumped control material such as a control rod is increased by spatially varying the absorber material to adjust for changes in the neutron spectrum within the lumped absorber mass.

The invention exploits the inherent spatial change in the neutron spectrum within a lumped poison mass in a thermal reactor neutron flux field. This is done by creating a hermaphroditic poison mass—i.e., a poison mass that incorporates two types of absorbers, the first being a strong thermal absorber near the surface of the mass, and the second being a strong resonance absorber in the interior of the poison mass. The outer regions of the poison mass are comprised of a strong "1/v" thermal absorber such as boron carbide.

The inner region of the poison mass is comprised of a resonance absorber, such as hafnium. This resonance absorber more appropriately exploits the hardened characteristics of the neutron spectrum within the absorber mass by selectively absorbing the epi-thermal neutrons. Alternatively, a mixture such as a mixture of hafnium, dysprosium and europium, or a single material that has both large thermal and resonance neutron absorption cross sections may be used as the resonance absorber with the thermal absorber such as boron carbide disposed surrounding the mixture or single material.

The creation of the hermaphroditic poison mass permits an increase in the control material worth while maintaining the external dimensions of the structure containing the control material, such as the control rod.

BRIEF DESCRIPTION OF THE DRAWINGS

Other objects and advantages of the subject invention will become apparent from the following detailed description read in conjunction with the accompanying drawings in which:

FIG. 4 is a graph of neutron flux within an absorber cylinder.

BEST MODE FOR CARRYING OUT THE INVENTION

Figure 1:
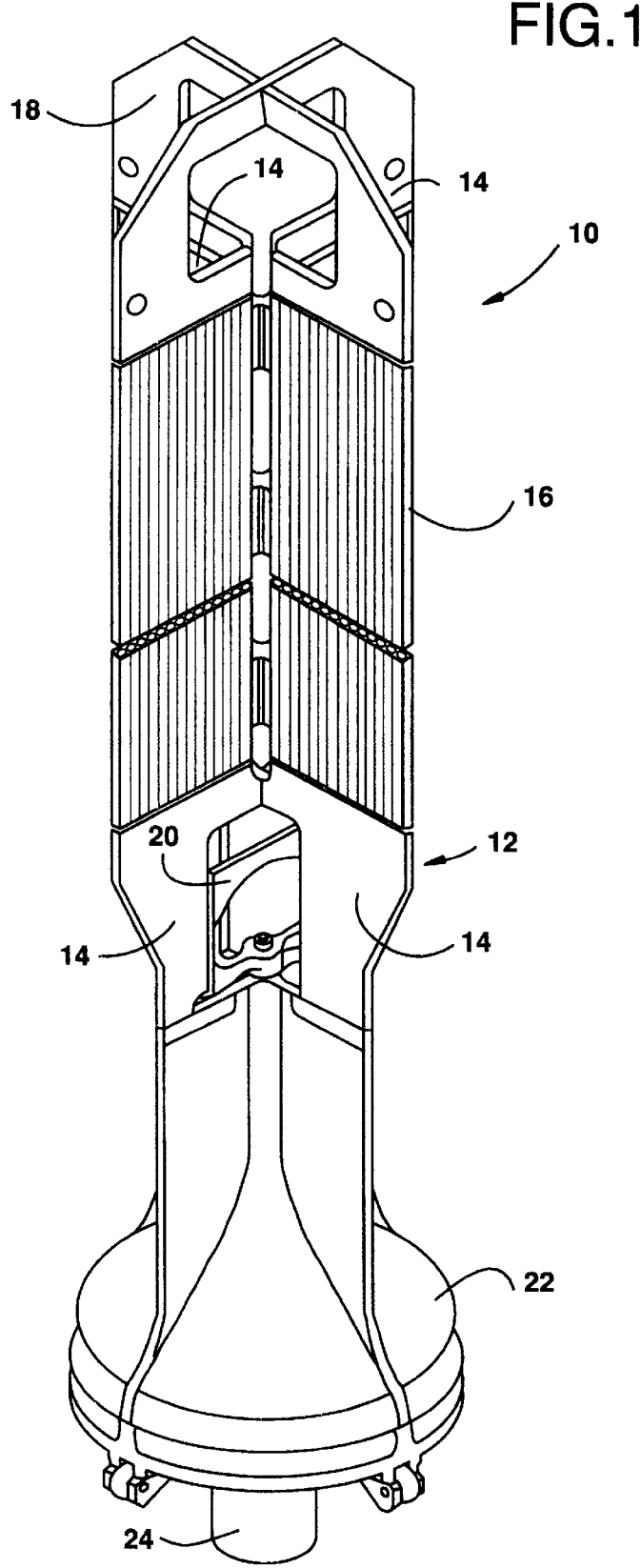
FIG. 1 is a perspective view of a control rod for a nuclear reactor.
Figure 2:
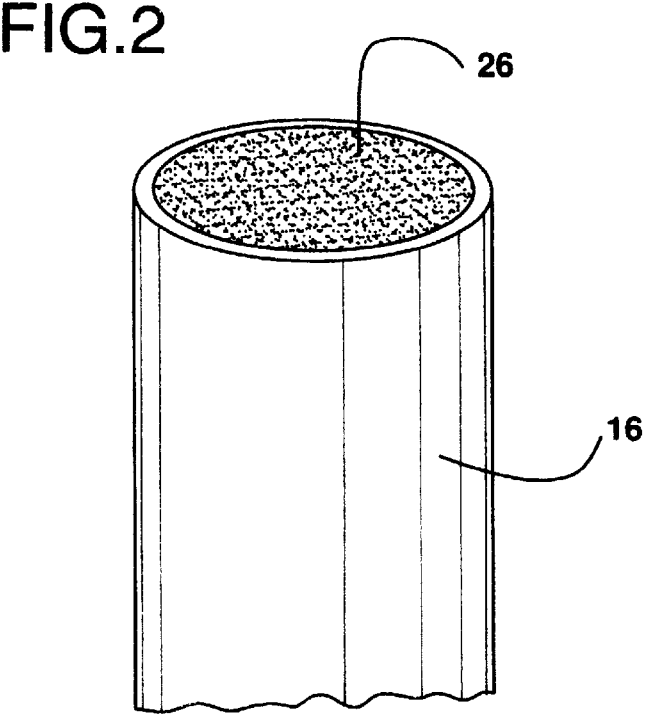
FIG. 2 illustrates a conventional BWR control rod absorber tube.

Referring now to the drawings, and particularly to FIGS. 1 and 2, there is illustrated a control rod assembly 10 of conventional construction. The control rod assembly includes a generally cruciform control body 12 with each wing 14 of the cruciform shaped body 12 including a plurality of elongated absorber tubes 16 extending substantially parallel to the longitudinal axis of the control rod. The absorber tubes 16 carry neutron absorbing material, which may be round hafnium rods and or round boron carbide powder in cylindrical, stainless steel capsules. FIG. 2 illustrates a conventional BWR control rod absorber tube 16.

The control rod assembly 10 also includes at its upper end handle 18, a coupling release handle 20 and a velocity limiter 22 along with a coupling socket 24. It will be appreciated that the control rod is adapted for insertion between fuel channels containing fuel bundles arranged in quadrants, such that the perpendicularly related wings of the control rod lie adjacent the corresponding sides of a fuel channel.

The neutron absorber tubes 16 contain neutron absorbing material in the form of round hafnium rods and/or round boron carbide filled capsules (generally indicated at 26). Typically, capsules of the same or different length may contain the boron carbide material in powder form while the upper end of the tube may be closed by a short rod formed of another neutron absorbing material, i.e., hafnium. The individual capsule segments may be of the same or different lengths and preferably have uniform loadings of neutron absorbing material, although non-uniform loadings may also be employed.

Figure 3:
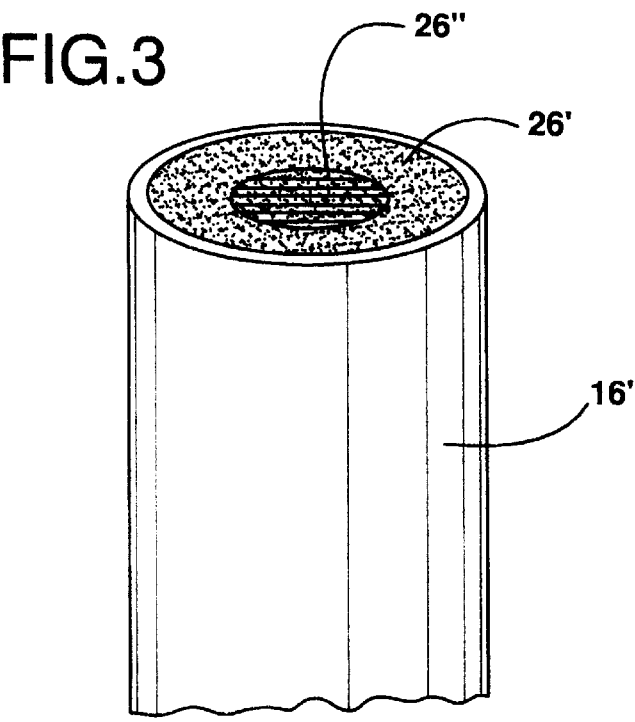
FIG. 3 is a perspective view of the hermaphroditic absorber according to the present invention.

In accordance with the present invention, referring to FIG. 3, the absorber tube 16' is loaded with a hermaphroditic absorber, i.e., a poison mass that incorporates two types of absorbers, the first being a strong thermal absorber 26' near the surface of the mass, and the second being a strong resonance absorber 26" in the interior of the poison mass such that the thermal absorber serves to screen the resonance absorber. The outer regions of the poison mass are comprised of a strong "1/v" thermal absorber. A strong "1/v" absorber refers to a poison that has a high absorbtivity for thermal neutrons. It has also been referred to as a black thermal absorber. The phrase "strong '1/v' absorber" is an art-recognized term as evidenced by its use in, for example, U.S. Pat. No. 3,255,092, U.S. Pat. No. 3,103,479 and U.K. Patent No. 1,067,523, the disclosures of which are hereby incorporated by reference. In the present invention, the thermal absorber is preferably boron carbide.

The inner region of the poison mass is comprised of a resonance absorber, which is preferably hafnium. Alternatively, a mixture of thermal and resonance absorber, such as a mixture of hafnium, dysprosium and europium or a single material that has both large thermal and resonance neutron absorption cross sections may be used as the resonance absorber in the interior of the poison mass. The relative amounts of each component in the mixture of hafnium, dysprosium and europium as the resonance absorber can be determined in at least two different ways. The neutron worth effect of various mixtures of the elements in the proper geometry may be calculated with a bench-marked computer code that solves the neutron transport problem with a Monte Carlo methodology. Such a code is MCNP™ from Los Alamos National Laboratory as described in "MCNP™—A General Monte Carlo N-Particle Transport Code," LA- 12625-M, November, 1993, Briesmeister, J. F., Ed. Alternatively, experiments may be performed in a critical assembly facility that determine the neutron worth of various mixtures in the desired geometrical arrangement. It will also be appreciated that the adjustment of neutron worth of such combinations of materials would be readily determined by those of ordinary skill in the art. As an example, Japanese Publication 56-79993 provides specific ranges of rare earth oxide mixtures used to obtain a viable control rod design. Similarly, U.S. Pat. No. 2,859,163 gives a prescription for combining cadmium-rare earth oxide glass with a zirconium matrix to obtain a worth equivalent to a reference absorber. An example of a mixture obtained by experimentation is disclosed in U.S. Pat. No. 3,923,502. Each of the disclosures in the above-mentioned publications is hereby incorporated by reference. The creation of the hermaphroditic poison mass permits an increase in the control material worth while maintaining the external dimensions of the structure containing the control material, such as the control rod. The resonance absorber more appropriately exploits the hardened characteristics of the neutron spectrum (FIG. 4) within the absorber mass by selectively absorbing the epi-thermal neutrons. That is, worth increases are obtained by placing neutron absorbers according to their spectral characteristics.

It should be appreciated that while the cited example is applicable to a conventional BWR control rod, the invention is applicable to any nuclear system that uses lumped absorbers for parasitic absorption of neutrons, including not only thermal reactors, but also fast or epi-thermal reactors, and the invention is not meant to be limited to the specific embodiments.

In accordance with the invention, higher worth control rods can be obtained, which are important to obtain adequate control for thermal reactors that incorporate mixed oxide fuels. Moreover, the higher worth control materials generate an economic benefit in uranium fueled reactors.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A control material for a nuclear system that uses lumped absorbers for parasitic absorption of neutrons, the control material comprising a thermal absorber disposed surrounding a resonance absorber such that the resonance absorber is screened by the thermal absorber, wherein said resonance absorber comprises a mixture of hafnium, dysprosium and europium.

2. A control material as claimed in claim 1, wherein said thermal absorber comprises a 1/v absorber.

3. A control material as claimed in claim 2, wherein said thermal absorber comprises boron carbide.

4. A control material as claimed in claim 1, wherein said thermal absorber comprises boron carbide.

5. A control rod for a nuclear reactor comprising a plurality of absorber tubes loaded with a thermal absorber disposed surrounding a resonance absorber such that the resonance absorber is screened by the thermal absorber, wherein said resonance absorber comprises a mixture of hafnium, dysprosium and europium.

6. A control rod as claimed in claim 5, wherein said thermal absorber comprises a 1/v absorber.

7. A control rod as claimed in claim 6, wherein said thermal absorber comprises boron carbide.

8. A control rod as claimed in claim 5, wherein said thermal absorber comprises boron carbide.

* * * * *